(12) United States Patent
Fessler-Knobel et al.

(10) Patent No.: US 9,272,379 B2
(45) Date of Patent: Mar. 1, 2016

(54) MOUNTING DEVICE AND METHOD FOR MOUNTING A COMPONENT ON A COMPONENT CARRIER USING AN ADHESIVE

(75) Inventors: Martin Fessler-Knobel, Munich (DE); Roland Huttner, Jesenwang (DE)

(73) Assignee: MTU Aero Engines GmbH, Munich (DE)

( * ) Notice: Subject to any disclaimer, the term of this patent is extended or adjusted under 35 U.S.C. 154(b) by 82 days.

(21) Appl. No.: 13/582,965

(22) PCT Filed: Mar. 9, 2011

(86) PCT No.: PCT/DE2011/000243
§ 371 (c)(1),
(2), (4) Date: Nov. 16, 2012

(87) PCT Pub. No.: WO2011/110167
PCT Pub. Date: Sep. 15, 2011

(65) Prior Publication Data
US 2013/0160940 A1    Jun. 27, 2013

(30) Foreign Application Priority Data
Mar. 11, 2010 (DE) .................... 10 2010 010 942

(51) Int. Cl.
*B23Q 3/08* (2006.01)
*B23Q 3/06* (2006.01)
*F01D 5/28* (2006.01)
*F01D 25/28* (2006.01)

(52) U.S. Cl.
CPC ............... *B23Q 3/084* (2013.01); *B23Q 3/062* (2013.01); *F01D 5/282* (2013.01); *F01D 25/28* (2013.01); *F05D 2230/60* (2013.01); *Y10T 29/53991* (2015.01)

(58) Field of Classification Search
CPC ....................................................... B23Q 3/08
USPC ..................................... 156/305, 247; 29/283
See application file for complete search history.

(56) References Cited

U.S. PATENT DOCUMENTS

| | | | | |
|---|---|---|---|---|
| 4,822,656 A | * | 4/1989 | Hutter, III | 428/41.8 |
| 6,499,614 B1 | * | 12/2002 | Thompson | 215/6 |
| 6,503,356 B1 | * | 1/2003 | Sakai et al. | 156/247 |
| 7,172,676 B2 | * | 2/2007 | DeMeter | 156/379.6 |
| 7,524,390 B2 | * | 4/2009 | DeMeter et al. | 156/247 |
| 8,062,462 B2 | * | 11/2011 | Sandmeier | 156/275.5 |
| 2003/0062115 A1 | * | 4/2003 | Sakai et al. | 156/247 |
| 2007/0221328 A1 | * | 9/2007 | DeMeter et al. | 156/344 |

(Continued)

FOREIGN PATENT DOCUMENTS

DE    10 2007 020 957 A1    11/2008
DE    10 2008 012 299 A1    9/2009

(Continued)

OTHER PUBLICATIONS

PCT/DE2011/000243 PCT/ISA/210, dated Aug. 22, 2011, 3 pages.

*Primary Examiner* — Michael N Orlando
*Assistant Examiner* — Margaret Squalls
(74) *Attorney, Agent, or Firm* — Crowell & Moring LLP

(57) ABSTRACT

A mounting device and method for mounting a component is disclosed. The mounting device includes a component carrier and an adapter. The adapter is insertable into a guide of the component carrier. The method uses the mounting device to mount a component on the mounting device.

6 Claims, 4 Drawing Sheets

(56) References Cited

U.S. PATENT DOCUMENTS

| | | |
|---|---|---|
| 2008/0110015 A1* | 5/2008 | Sakai et al. ..................... 29/760 |
| 2008/0173394 A1* | 7/2008 | Sandmeier ................. 156/275.5 |
| 2009/0025220 A1* | 1/2009 | Fessler-Knobel ............ 29/889.7 |
| 2012/0011703 A1 | 1/2012 | Fessler-Knobel et al. |
| 2012/0175055 A1 | 7/2012 | Fessler-Knobel et al. |
| 2013/0160940 A1* | 6/2013 | Fessler-Knobel et al. .... 156/247 |

FOREIGN PATENT DOCUMENTS

| | | |
|---|---|---|
| DE | 102008012299 A1 * | 9/2009 |
| DE | 10 2009 013 726 A1 | 9/2010 |
| DE | 10 2009 032 703 A1 | 1/2011 |

\* cited by examiner

MOUNTING DEVICE AND METHOD FOR MOUNTING A COMPONENT ON A COMPONENT CARRIER USING AN ADHESIVE

This application claims the priority of International Application No. PCT/DE2011/000243, filed Mar. 9, 2011, and German Patent Document No. 10 2010 010 942.8, filed Mar. 11, 2010, the disclosures of which are expressly incorporated by reference herein.

BACKGROUND AND SUMMARY OF THE INVENTION

The invention relates to a mounting device for mounting a component on a component carrier and a method for mounting a component in this type of mounting device.

Components frequently pass through a number of processing stations before they obtain their final form. Most of the time, the components are positioned in the processing stations by means of component carriers on which the components are fixed in advance in a mounting device.

The applicant's German patent application DE 10 2007 020 957 A1 discloses for example a mounting device for mounting a turbine blade on a component carrier by means of an adhesive bond. The component carrier has a mounting surface designed with a contour that is close to a rotor blade on which a radiation-hardenable adhesive is applied over a large surface.

This known solution makes very secure fixation of the turbine blade possible, however, because of the contoured design of the mounting surface, the component carrier is only able to be used for components that have a similar rotor blade geometry. Furthermore, when releasing the turbine blades from the component carrier, the rotor blade may inadvertently be damaged, because it is adhered to the mounting surface over a large surface.

As a result, to compensate for geometric deviations between a mounting surface of a component carrier and a component surface, spacer elements such as strips or rectangular solids are frequently used, which are positioned between the component carrier and the component and also adhered. However, these spacer elements are difficult to position in the case of certain component geometries such as, for example, spherically shaped component surfaces. Furthermore, because of the spacer elements, it is not possible to adjust an optimum adhesive gap.

The object of the present invention is creating a mounting device and a method for mounting a component on a component carrier by means of an adhesive, which eliminates the aforementioned disadvantages, makes universal applicability possible with a plurality of component shapes, and in particular allows an optimum adjustment of an adhesive gap and a simple way to release the mounted component.

A mounting device according to the invention for mounting a component on a component carrier by means of an adhesive, e.g., a radiation-hardenable adhesive or a 2-component-based adhesive, has a plurality of adapters for positioning the component in relation to the component carrier, each of which is inserted into a respective guide of the component carrier and each of which has an adhesive surface for producing an adhesive bond with the component. The guided adapters allow geometric deviations between a mounting surface of the component carrier and an opposing component surface to be equalized so that it is always possible to adjust a locally optimum adhesive gap. The mounting surface no longer has to be designed so that its contour is close to the opposing component surface, thereby allowing the mounting device to be used with a plurality of components having different geometries. In this case, guidance of the adapters in the component carrier prevents the adapter from inadvertently displacing or shifting from its adjusted position. The adapters serve so to speak as individually controllable, moveable props or supports, which are located in stationary guides. The adapters are advantageously designed in a uniform manner so that they do not have to be allocated only to a specific borehole. Furthermore, uniformly designed adapters may be used to fix components having different contours.

The guides are preferably configured as through-boreholes, which extend through the component carrier from a front mounting surface to a rear carrier surface. This simplifies the insertion or the positioning of the adapters in particular. In doing so, the adapters can be moved continuously in the guides so that it is possible to mount components having a variety of geometries virtually independently of the progression of the mounting surface.

At the same time, however, this exemplary embodiment also permits use with components having a component surface whose contour is close to the mounting surface, because the adapters are able to be positioned in the guides in such a way that they terminate flush with it.

The adapters may have a cylindrical outer circumference and thereby a cup-like cross section for example. They preferably have an outside diameter which is smaller than an inside diameter of the guides or boreholes so that a crescent or annular gap is formed between the adapters and the borehole walls, which permits excess adhesive to be accommodated and thereby makes circumferential-side adhesion of the adapters to the component carrier possible.

However, the adapters may also each have a cylindrical body, which can be brought into abutment with the component surface so it seals. To supply the adhesive to the adhesive surface and to the respective borehole wall, these adapters have an appropriately designed internal channel system. It is possible to manufacture these types of adapters simply as plastic injection molded parts.

It is possible to release the component from the component carrier or eject the adapters so that the component is protected if at least one ejector element is provided that can be pressed against a rear face of the adapters. In doing so, reduced force can be used for ejection if, as in the case of one exemplary embodiment, a heating element is integrated into the ejector element by means of which the hardened adhesive can be weakened prior to ejection. The heating element may emit microwaves or UV radiation for example, or develop an appropriate magnetic field. Furthermore, the radiation required for release may be introduced into the adhesive gap by means of an external radiation source, e.g., by means of UV rays or a microwave transmitter.

Releasing the component from the component carrier or ejecting the adapters can be simplified considerably if the adapters are configured as disposable elements, which can be destroyed during ejection. By doing so, a cleaning of the adapters is eliminated in particular. However, the adapters may also be designed as reusable multi-use elements that are consequently not destroyed during the releasing process.

In the case of a method according to the invention for mounting a component on a component carrier by means of an adhesive, e.g., a radiation-hardenable adhesive or a 2-component-based adhesive, the component is first of all positioned in relation to the component carrier. Then a local adhesive gap is adjusted between a respective adapter inserted into a guide of the component carrier and the component. Then the adhesive is hardened to produce an adhesive bond.

After the adhesive hardens, the component is firmly connected to the component carrier and may be processed appropriately. This method allows precise, secure and quick fixation of the component in relation to the component carrier, because it is possible to equalize geometric differences between a mounting surface of the component carrier and an opposing component surface by means of the adapters so that, despite the fact that the contours of the mounting surface and the component surface lack conformity, it is possible to fix the component in relation to or on the component carrier via a plurality of optimum adhesive gaps.

In the case of one exemplary embodiment, the adhesive is filled into the guides prior to insertion of the adapters into the guides. When inserting the respective adapter, the adhesive is distributed to the appropriate adhesive regions between the adapters and the component as well as between the adapters and the component carrier. In the case of another exemplary embodiment, the adhesive is applied on the front side to the adapters prior to insertion of the adapters into the boreholes. The adapters may be inserted fully automatically, partially automatically or manually.

In the case of another exemplary embodiment, the adhesive is distributed via an internal channel system of the adapters inserted into the guides, which allows the adhesive to be applied in an especially targeted and metered manner. In doing so, the respective adapter is preferably inserted in the borehole up to the component surface and forms a seal there to keep the adhesive from running. The adapter is supported laterally on the borehole wall and the adhesive supply is increased until the channel system has disposed an adequate amount of adhesive at the predetermined regions between the respective adapter and the component carrier as well as the adapter and the component. In the process, the supply of adhesive may take place continuously or discontinuously, e.g., a drop at a time.

The component is preferably released via break-away of the adapters by means of an ejector element, which engages on a rear face of the adapters. In the case of one exemplary embodiment, in order to reduce the ejection force, the adhesive may be weakened via a preferably integral heating element of the ejector element. In doing so, according to one exemplary embodiment, the adapters may be destroyed during ejection thereby eliminating corresponding cleaning measures for reusing the adapters. Ejection may take place fully automatically, partially automatically or manually.

Other advantageous exemplary embodiments of the present invention are the subject matter of additional dependent claims.

Preferred exemplary embodiments of the present invention will be explained in greater detail in the following.

DETAILED DESCRIPTION OF THE DRAWINGS

Structurally equivalent elements in the figures bear the same reference numbers, but, if there are several structurally equivalent elements in a single figure, for the sake of clarity only some of the elements are labeled with a reference number.

Figure 1:
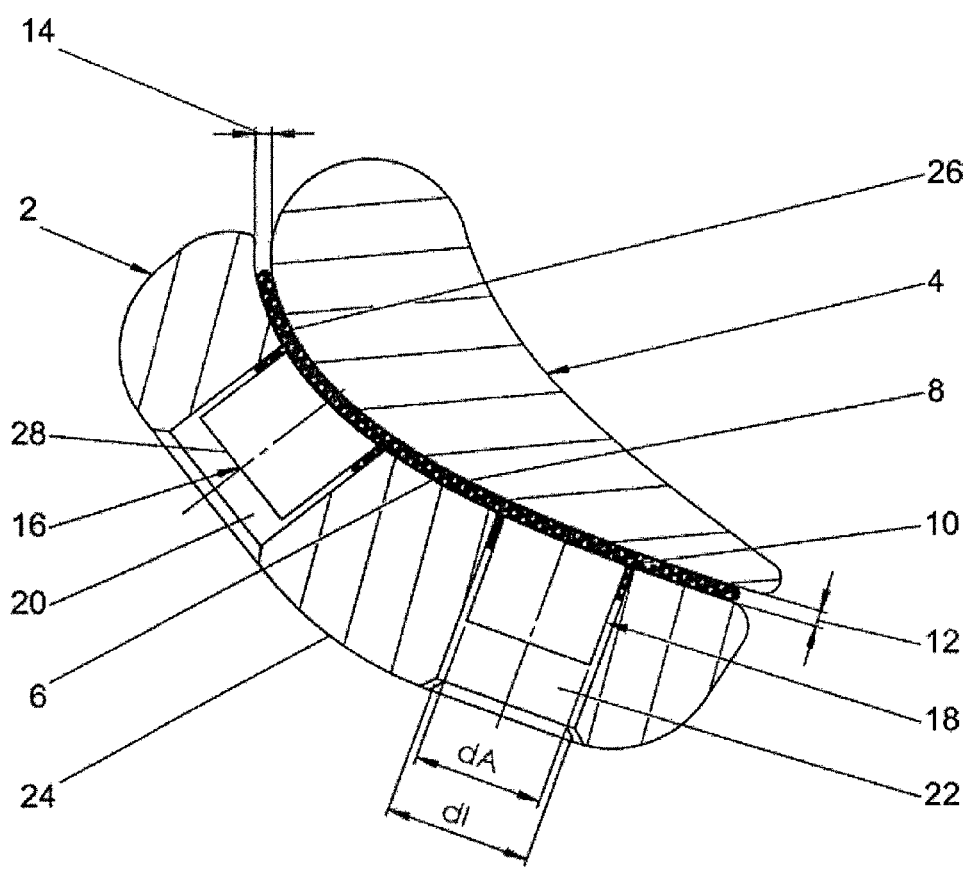
FIG. 1 is a cross section through a component carrier according to the invention on which a component is mounted.

FIG. 1 shows a cross section through a component carrier 2 according to the invention of a mounting device (not shown in further detail), on which a component 4, e.g., a turbine or compressor blade, is mounted. The component carrier 2 has a concave mounting surface 6, which is designed with a contour that is comparatively close to an opposing convex component surface 8. The component 4 is secured to the component carrier 2 using a radiation-hardenable adhesive 10 applied in sections, whereby a plurality of individual adhesive bonds that are spaced apart from one another is created, each having a respective adhesive gap 12, 14 with an optimum gap width.

The adhesive 10 is disposed in the region of adapters 16, 18, each of which is guided into a borehole 20, 22 of the component carrier 2. The boreholes 20, 22 run radially in relation to the mounting surface 6 and extend through the component carrier 2 between the mounting surface 6 and a rear carrier surface 24.

The adapters 16, 18 are preferably made of a breakable, possibly radiation-permeable material such as glass or quartz glass or a correspondingly brittle plastic material and have a cylindrical shape. The adapters have an adhesive surface 26 facing the component surface 8, which is configured to be flat, and a rear face 28 as well as an outside diameter dA which is smaller than an inside diameter dI of the boreholes 20, 22. The adapters 16, 18 are thereby the connective link between the component carrier 2 and the component 4.

In the following, a method according to the invention for positioning the component 4 on the component carrier 2 or releasing it therefrom will be explained, wherein the method will be explained in a representative manner for all adapters 16, 18 and for all boreholes or guides 20, 22 on the basis of the adapter 16 and the borehole 20.

Figure 2:
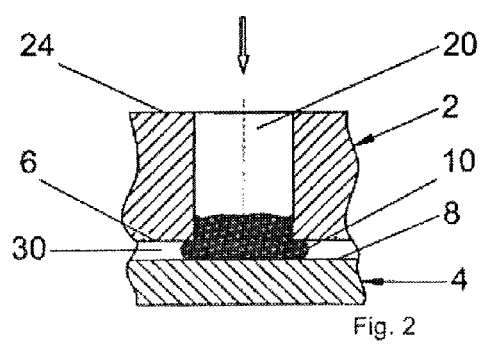
FIGS. 2 to 5 illustrate process steps for mounting a component on a component carrier or releasing it therefrom in accordance with a first exemplary embodiment according to the invention.

According to FIG. 2, the component 4 is positioned to begin with in relation to the component carrier 2 in such a way that the component surface 8 thereof is at a distance from the mounting surface 6 in order to form an adhesive gap. Then the adhesive 10 is filled into the borehole 20 starting from the rear carrier surface 24 in the direction of the arrow, wherein the viscosity of the adhesive 10 prevents the adhesive from running out of the borehole 20 into an interspace 30 between the mounting surface 6 and the component surface 8. The adhesive 10 flows into the interspace 30 only in the edge region of the borehole 20. Because the adhesive 10 is distributed in a defined manner, a porous and flexible flow aid, a so-called pad, may also be used.

Figure 3:
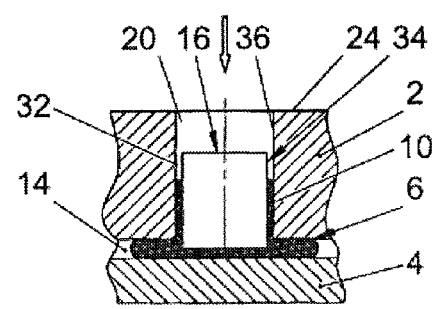
Figure 4:
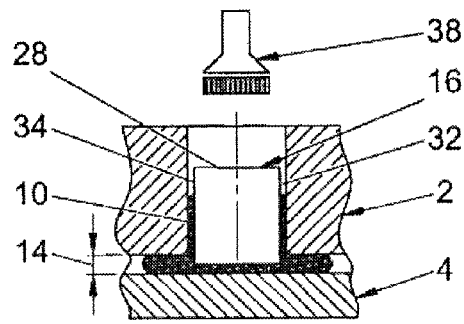

Then in accordance with FIG. 3, the adapter 16 is inserted into the borehole 20 starting from the rear carrier surface 24 in the direction of the arrow until it projects over the mounting surface 6 with a head section and thus with the adhesive surface 26 thereof in such a way that an optimum adhesive gap 14 is adjusted between the adhesive surface 26 and the respective section of the component surface 8. Because of the outside diameter dA that is smaller than the inside diameter dI of the borehole 20, an annular gap 32 forms between the outer wall 34 thereof and the opposing borehole wall 36 into which the excess adhesive 14 is displaced from the interspace 30 and the adhesive gap 14.

After adjusting the optimum adhesive gap 14, the adhesive 10 is hardened by means of a radiation source 38 positioned opposite from the rear face 28 of the adapter 16 and emitting electromagnetic radiation, e.g., light. In the process, both the adhesive 10 in the annular gap 32 as well as the adhesive in the adhesive gap 14 is hardened so that the adapter 16 is adhered on its circumferential side via its outer wall 34 to the component carrier 2 and on the front side via its adhesive surface 26 to the component 4. Therefore, the component 4 is essentially tethered indirectly to the component carrier 2 by the adapter 16 via the front-side adhesive bond in the region of the adhesive surface 26 and via the circumferential-side adhesive bond in the region of the outer wall 34.

Figure 5:
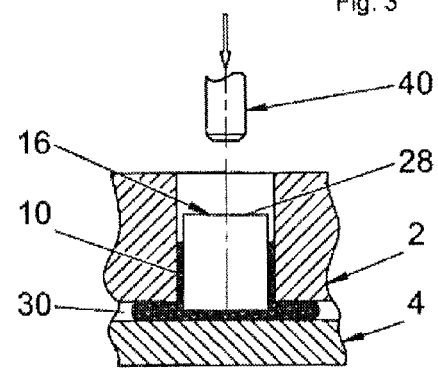

To release the component 4 from the component carrier 2, a bolt-like ejector element 40 according to FIG. 5 is used, which is pressed against the rear face 28 of the adapter 16 in the direction of the arrow. During ejection, the adapter 16 is preferably destroyed and as a result the adhesive bond of the adapter 16 with the component carrier 2 as well as with the component 4 is reversed, wherein the adhesive 10 that has accumulated in the interspace 30 in the edge region of the borehole 20 or the adhesive disposed directly between the component 4 and the component carrier 2 prevents the component 4 from getting damaged. The adapter 16 breaks into individual pieces, which may simply be removed from the component carrier 2 or the component 4.

Figure 6:
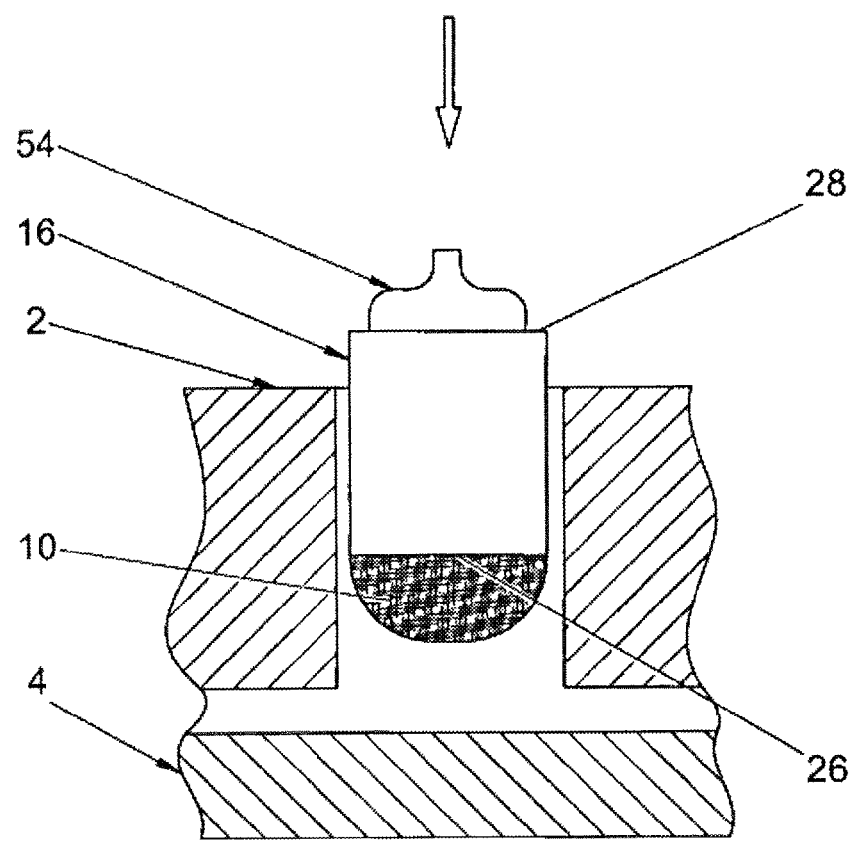
FIG. 6 illustrates a process step for inserting an adapter in accordance with a second exemplary embodiment according to the invention.

However, as FIG. 6 shows, the adhesive 10 may also be applied on the front side in the region of the adhesive surface 26 of the adapter 16 and the adapter may then be introduced afterward into the borehole 20 for example via a suction bell 54 that engages on the rear face 28 thereof.

Figure 7:
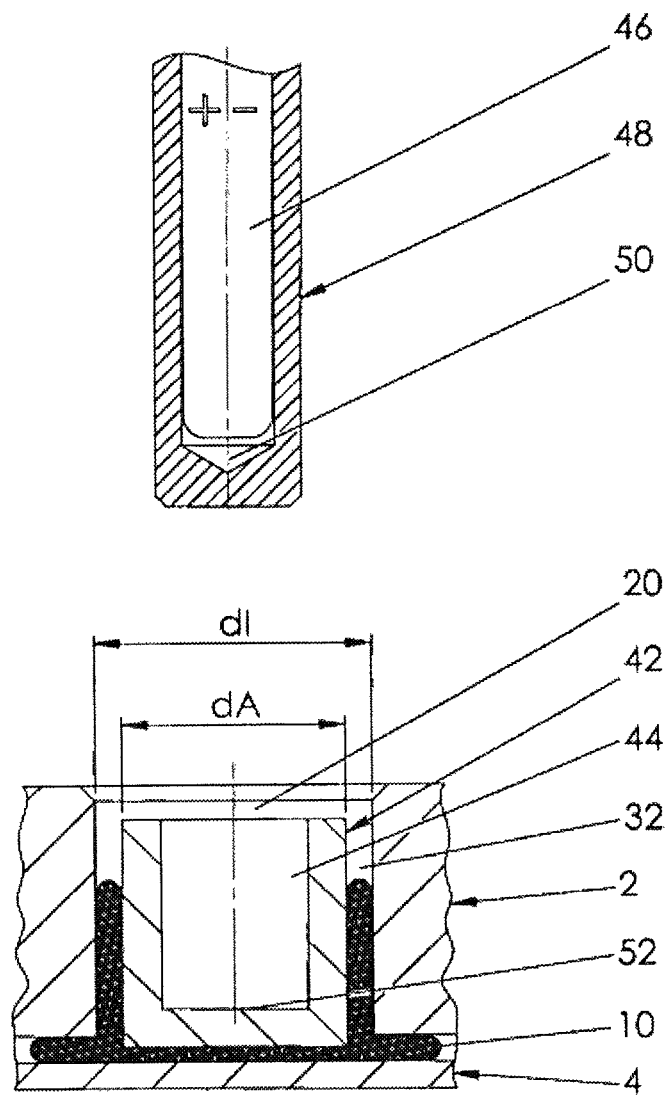
FIG. 7 illustrates a process step for releasing a component from the component carrier in accordance with a second exemplary embodiment according to the invention.

However, releasing the adhesive bonds or ejecting the respective adapter 16 may also take place with reduced force by heating the adhesive 10. Such a solution according to the invention is depicted in FIG. 7. In this case, especially because of the reduced force, the destruction of the adapter 16 or 42 may be prevented so that the adapter may be reused after appropriate cleaning.

According to FIG. 7, such an adapter 42 has a cup-like cross section with a cavity 44 that is open on the rear to accommodate a bolt-like ejector element 48 equipped with a heating element 46. The heating element 46 is disposed in a blind hole borehole 50 of the ejector element 48 and can be operated electrically. In accordance with the adapter 16 described in the foregoing, this adapter 42 also has an outside diameter dA that is smaller than an inside diameter dI of the borehole 20 for forming an annular gap or crescent-shaped gap 32.

To eject the adapter 42 or to release the component 4 from the component carrier 2, the ejector element 48 is moved in the direction of the adapter 42 until it is immersed with its heating element 46 in the cavity 44 at least in sections. The heating element 46 is or becomes activated and thereby causes the adhesive 10 to heat up, which produces a considerable weakening of the adhesive bond on the circumferential side and front side. As soon as the adhesive 10 is heated sufficiently, the forward movement of the ejector element 48 is continued, wherein the adapter 42 is ejected from the borehole 20 in that the front side of the ejector element 48 strikes a base surface 52 delimiting the cavity 44, so that the component 4 is released from the component carrier 2.

The invention discloses a mounting device for mounting a component on a component carrier using an adhesive, the device being equipped with a plurality of adapters, each of which is inserted into a respective guide in the component carrier in order to position the component in relation to the carrier. Each adapter has an adhesive surface for producing an adhesive bond with the component. The invention also relates to a method for mounting a component using a mounting device of this type.

The invention claimed is:

1. A mounting device in combination with a component, comprising:
    a component carrier, wherein a front mounting surface of the component carrier is concave; and
    an adapter, wherein the adapter is disposed in a guide of the component carrier and wherein the guide is a passage opening which extends through the component carrier from the front mounting surface of the component carrier to a rear carrier surface of the component carrier;
    wherein the component has a convex surface, wherein an adhesive secures the concave front mounting surface of the component carrier to the convex surface of the component, and wherein the adhesive secures a circumferential side wall of the adapter to the component carrier in the guide of the component carrier.

2. The mounting device in combination with the component according to claim 1, wherein the adapter is a cylindrical body with an outside diameter which is smaller than an inside diameter of the guide.

3. The mounting device in combination with the component according to claim 1, wherein the adapter has a cup-like cross-section.

4. The mounting device in combination with the component according to claim 1, further comprising an ejector element which is pressable against a rear face of the adapter.

5. The mounting device in combination with the component according to claim 4, wherein the ejector element includes a heating element.

6. The mounting device in combination with the component according to claim 1, wherein the adapter is disposable.

* * * * *